(12) United States Patent
Walawender et al.

(10) Patent No.: US 11,554,646 B2
(45) Date of Patent: Jan. 17, 2023

(54) OPEN LOOP FIXED OUTSIDE PULL HANDLE INTEGRATED WITH DOOR BELT SEAL

(71) Applicant: Ford Global Technologies, LLC, Dearborn, MI (US)

(72) Inventors: Chester Stanislaus Walawender, Livonia, MI (US); Francis Raymond Gillis, Farmington Hills, MI (US); Rajesh K. Patel, Farmington Hills, MI (US); Thomas Michael Herline, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 815 days.

(21) Appl. No.: 16/420,320

(22) Filed: May 23, 2019

(65) Prior Publication Data
US 2020/0369128 A1 Nov. 26, 2020

(51) Int. Cl.
*B60J 5/04* (2006.01)
*E05B 85/12* (2014.01)
*E05F 11/54* (2006.01)

(52) U.S. Cl.
CPC .............. *B60J 5/0434* (2013.01); *E05B 85/12* (2013.01); *B60J 5/047* (2013.01); *B60J 5/0411* (2013.01); *E05F 11/54* (2013.01); *E05Y 2900/531* (2013.01)

(58) Field of Classification Search
CPC ........ B60J 5/0434; B60J 5/0411; B60J 5/047; E05B 85/12; E05F 11/54; E05Y 2900/531
See application file for complete search history.

(56) References Cited

U.S. PATENT DOCUMENTS

| 4,703,963 | A | 11/1987 | Ball | |
|---|---|---|---|---|
| 4,867,501 | A | 9/1989 | Nomura et al. | |
| 6,075,298 | A | 6/2000 | Maue et al. | |
| 7,513,544 | B2 * | 4/2009 | Cummins | E05B 85/16 292/336.3 |
| 8,109,545 | B2 * | 2/2012 | Lukas | E05B 85/16 292/87 |
| 8,162,360 | B2 * | 4/2012 | Takaya | E05B 79/04 292/336.3 |
| 8,451,087 | B2 | 5/2013 | Krishnan et al. | |
| 8,469,411 | B2 * | 6/2013 | Costigan | E05B 85/16 292/336.3 |

(Continued)

FOREIGN PATENT DOCUMENTS

| CN | 2683455 Y | 3/2005 |
|---|---|---|
| CN | 203237009 U | 10/2013 |

(Continued)

*Primary Examiner* — Mark A Williams
(74) *Attorney, Agent, or Firm* — Vichit Chea; Price Heneveld LLP

(57) ABSTRACT

A vehicle door includes a belt structure and a rigid handle having a rigid base and a rigid outer grip portion. The rigid outer grip portion includes a portion that is spaced apart from the base to form a gap. The base of the handle is rigidly connected to the belt structure whereby the outer grip portion of the handle does not move relative to the belt structure. The vehicle door may include a powered door opening mechanism that moves a portion of the door away from a vehicle body when actuated.

20 Claims, 8 Drawing Sheets

(56) References Cited

U.S. PATENT DOCUMENTS

| | | | |
|---|---|---|---|
| 8,783,743 B2* | 7/2014 | Park | E05B 85/16 |
| | | | 292/336.3 |
| 8,991,227 B2 | 3/2015 | Muller et al. | |
| 9,156,335 B1 | 10/2015 | Harter et al. | |
| 9,650,817 B2* | 5/2017 | Patel | E05B 77/02 |
| 10,087,671 B2 | 10/2018 | Linden et al. | |
| 2007/0069532 A1* | 3/2007 | Tenorio | E05B 77/06 |
| | | | 292/336.3 |
| 2010/0235057 A1 | 9/2010 | Papanikolaou et al. | |
| 2014/0000165 A1 | 1/2014 | Patel et al. | |
| 2015/0123409 A1* | 5/2015 | Lange | E05B 85/10 |
| | | | 292/336.3 |
| 2018/0058128 A1 | 3/2018 | Khan et al. | |
| 2020/0248488 A1* | 8/2020 | Muta | B60J 5/0413 |

FOREIGN PATENT DOCUMENTS

| | | |
|---|---|---|
| CN | 203783335 U | 8/2014 |
| CN | 103195324 B | 6/2015 |
| CN | 204899549 U | 12/2015 |
| FR | 2898632 A1 | 9/2007 |
| JP | 2006152780 A | 6/2006 |
| WO | 2017160787 A1 | 9/2017 |

* cited by examiner

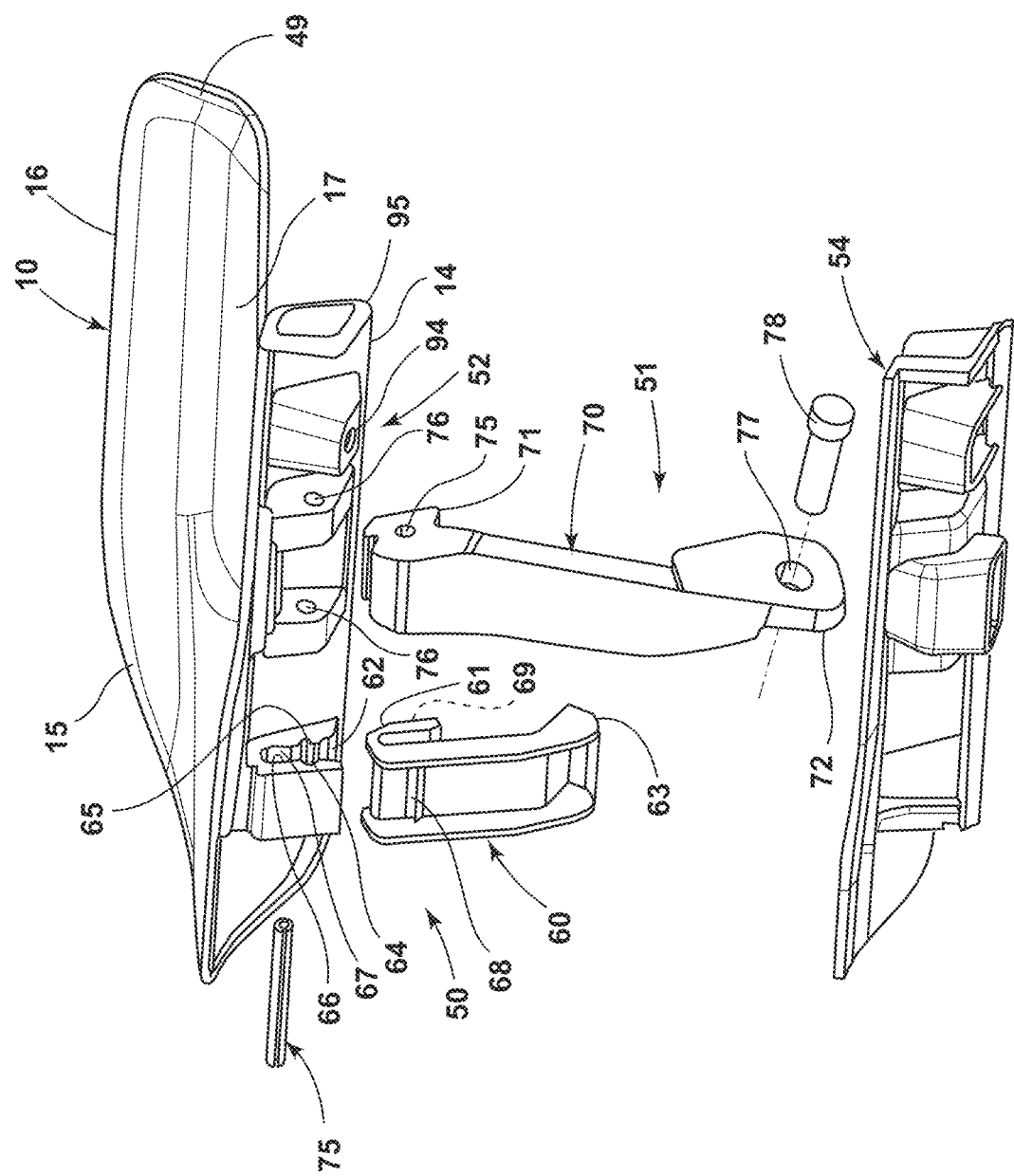

OPEN LOOP FIXED OUTSIDE PULL HANDLE INTEGRATED WITH DOOR BELT SEAL

FIELD OF THE INVENTION

The present invention generally relates to door handles for vehicles, and in particular to an outside door handle that is rigidly secured to a belt structure of a door.

BACKGROUND OF THE INVENTION

Various types of vehicle doors have been developed. Existing vehicle doors may include a moving handle that can be grasped and moved by a user to unlatch the door.

SUMMARY OF THE INVENTION

One aspect of the present disclosure is a vehicle door including a door structure having forward and rearward portions, and an internal door structure. The door structure includes an outer panel having forward and rearward edges, a lower edge extending between the forward and rearward edges, and an upper edge extending horizontally along a belt line of the vehicle door between the forward and rearward portions. The door structure further includes a window frame having an upright rear pillar attached to the internal door structure and extending upwardly above the rearward edge. The window frame includes an upper portion having a rearward edge attached to the upper end of the upright pillar, and a forward end attached to the internal door structure adjacent an upper portion of the forward edge of the outer panel, whereby the door structure forms a window opening above the belt line of the vehicle door. The internal door structure includes a belt reinforcement extending along an inner side of the outer panel adjacent the upper edge of the outer panel. The belt reinforcement is spaced inwardly from the upper edge of the outer panel. The door structure includes an upright rearwardly facing shut-face panel at the rearward portion of the door structure. The vehicle door further includes a rigid handle structure having an elongated horizontal portion and a transverse connecting portion extending outward from the elongated horizontal portion. The rigid handle structure further includes a cantilevered outer grip portion extending horizontally rearwardly from the forward portion whereby the forward portion comprises the sole structural connection of the outer grip portion to the door structure. The vehicle door further includes a first connector connecting the elongated horizontal portion of the rigid handle structure to the belt reinforcement adjacent the transverse connecting portion, and a second connector connecting the elongated horizontal portion of the rigid handle structure to the shut-face panel.

The door and/or handle may include any one or a combination of the following features:

The first connector may optionally comprise a hook structure engaging the belt reinforcement.

The hook structure may optionally form a downwardly-opening groove, and the belt reinforcement may optionally comprise an upright flange.

The rigid handle structure may optionally comprise a one-piece integrally formed structure.

The upper edge of the outer panel may optionally be disposed in the downwardly-opening groove.

The door may include a clip having an upper U-shaped portion disposed in the downwardly-opening groove, and the U-shaped portion and upper edge portion of the belt reinforcement may be received in the U-shaped portion of the clip.

The belt reinforcement may include a lower edge portion, and the clip may include a lower connector engaging the lower edge portion of the clip to thereby prevent upward movement of the clip.

The downwardly-opening groove may include spaced apart sidewalls, wherein each sidewall includes a retaining groove.

The U-shaped portion of the clip may include tapered projections that are received in the retaining grooves.

The second connector may comprise a rigid link having an upper end connected to the rigid handle structure, and a lower end connected to the shut-face panel.

The upper end of the rigid link may be connected to the elongated portion of the rigid handle structure by a pin.

The door may include a third connector connecting the elongated portion of the rigid handle structure to the door structure adjacent an outer portion of the rearward edge of the outer panel.

The door structure may include an inner panel having a rearward edge that abuts and overlaps the outer panel adjacent the rearward edge of the outer panel.

The third connector may comprise a threaded fastener extending through openings in the inner and outer panels where the inner and outer panels abut and overlap.

The door structure may include an inner side, and an electrically-powered door opening mechanism having a plunger that extends from the inner side of the door structure adjacent a rear portion of the door structure when the electrically-powered door opening mechanism is actuated to thereby move the door structure away from a vehicle body.

The vehicle door may include a powered latch mechanism that can be actuated and unlatched electronically without movement of the rigid handle structure.

Another aspect of the present disclosure is a vehicle door including a door structure having inner and outer sides, a window opening, and a horizontal belt structure extending along the lower edge of the window opening. The vehicle door includes a rigid handle having an elongated rigid base and an elongated rigid outer grip portion that is generally parallel to the elongated rigid base. The elongated rigid outer grip portion includes a rear end portion that is spaced apart from the base to form a gap. A forward portion of the elongated rigid outer grip portion is rigidly fixed to the elongated rigid base, and the elongated rigid base of the rigid handle is rigidly connected to the horizontal belt structure whereby the elongated outer grip portion of the rigid handle does not move relative to the horizontal belt structure. The vehicle door may include an electrically-powered door opening mechanism having a plunger that extends from the inner side of the door structure adjacent a rear portion of the door structure when the electrically-powered door opening mechanism is actuated to thereby move the door structure away from a vehicle body.

Another aspect of the present disclosure is a method of securing a rigid door handle to a vehicle door. The method includes providing a door structure having inner and outer sides, a window opening, and a horizontal belt structure extending along a lower edge of the window opening. The method further includes providing a rigid handle having an elongated rigid base and an elongated rigid outer grip portion having a forward end that is rigidly fixed to the elongated rigid base, and a rearward end that is spaced apart from the elongated rigid base to form a gap. The method includes rigidly fixing the rigid handle to the horizontal belt structure whereby the elongated rigid base and the elongated rigid outer grip portion cannot move relative to the door structure. The door may be provided with an electrically-powered latch that can be actuated and unlatched without movement of the rigid handle.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is an exploded isometric view of a vehicle door handle and connectors according to one aspect of the present disclosure;

DETAILED DESCRIPTION OF THE PREFERRED EMBODIMENTS

Figure 1:
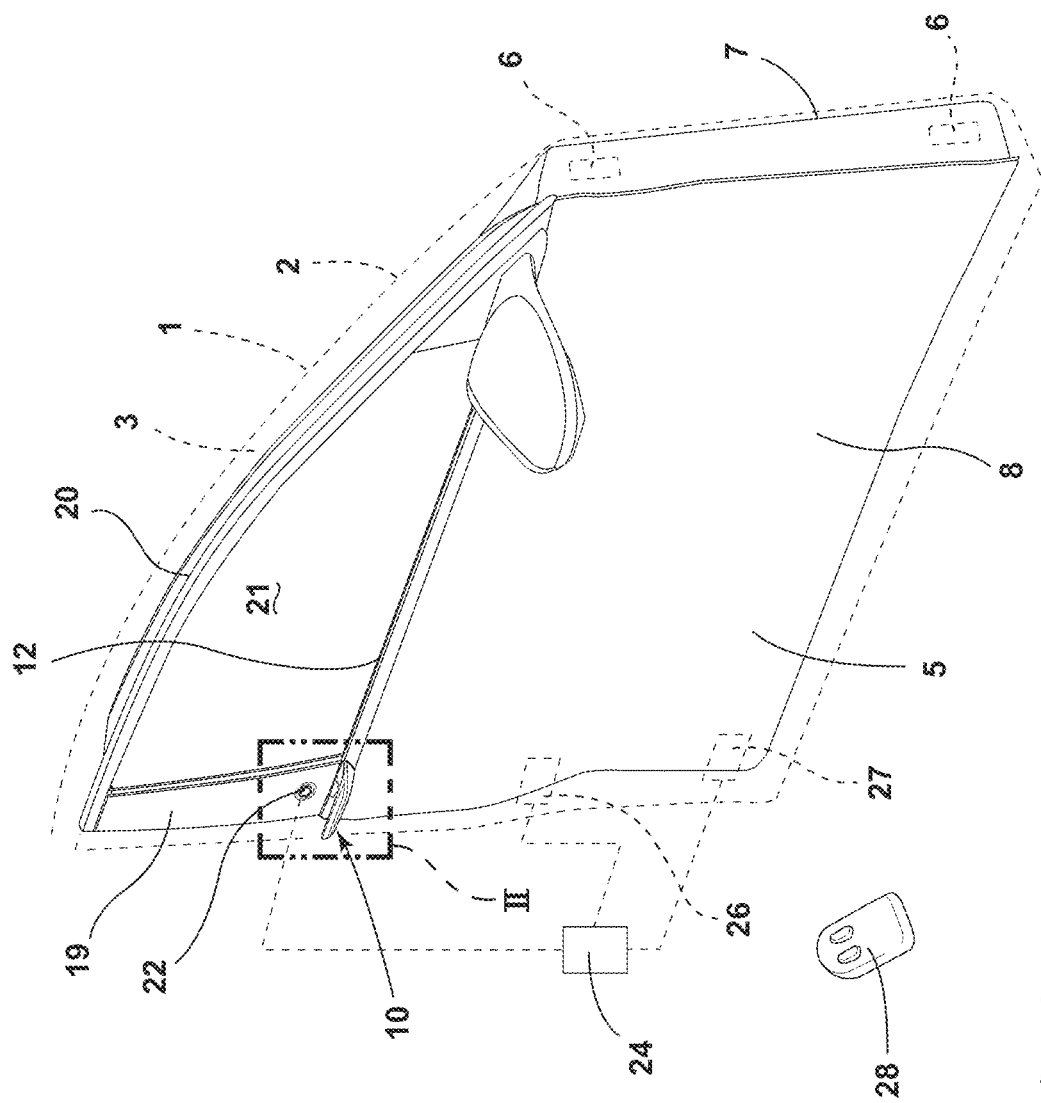
FIG. 1 is a partially schematic isometric view of a vehicle door according to one aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
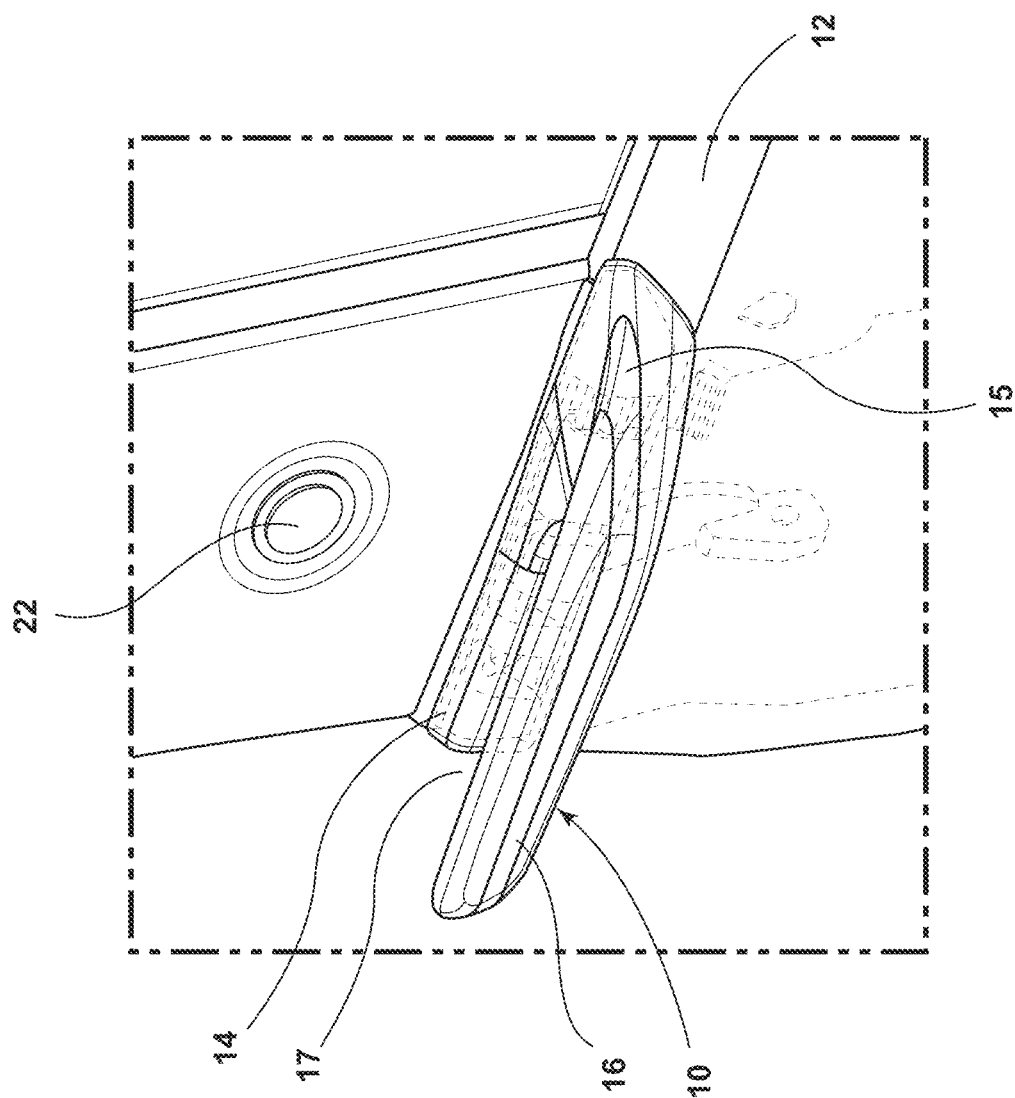
FIG. 2 is a partially fragmentary enlarged isometric view of a portion of the door of FIG. 1.

With reference to FIGS. 1 and 2, a vehicle 1 includes a body structure 2 forming a door opening 3. A vehicle door 5 is movably mounted to the body 2 via hinges 6 for rotation between open and closed positions. The hinges 6 may comprise conventional vehicle door hinges of a known type. Vehicle 1 may comprise virtually any type of vehicle having one or more movable doors 5 that selectively close off openings in the vehicle body 2. The door 5 includes a rigid handle structure 10 that is secured to a belt structure 12 of the door 5. As discussed in more detail below, the rigid handle structure 10 includes an elongated horizontal portion 14, a transverse connecting portion 15, and a cantilevered outer grip portion 16 extending horizontally rearwardly to form a gap 17 whereby the handle structure 10 has a fixed, non-movable, open loop configuration that is preferably integrated into the belt structure 12.

The vehicle door 5 may include a pillar 19 and an upper frame portion 20 that extend around a window opening 21. A user input device such as a proximity sensor or a push button 22 that may be actuated by a user to generate a door open request signal to a controller 24. Controller 24 may be operably connected to an electrically-powered latch mechanism 26 and an optional electrically-powered door opening or presenting mechanism 27. Controller 24 may be configured to cause latch 26 to unlatch, and also to actuate door opening mechanism 27 if a signal is received from the user input 22. The controller 24 may also be configured to communicate wirelessly with a device such as a fob 28. Thus, a user may actuate the fob 28 to generate a door open signal that is processed by the controller 24. If predefined conditions are met (e.g. an authorized user is detected based on a signal from fob 28), a controller 24 may actuate powered latch 26 and powered door actuator 27 based on a signal from the fob 28 or user input/push button 22.

Figure 3:
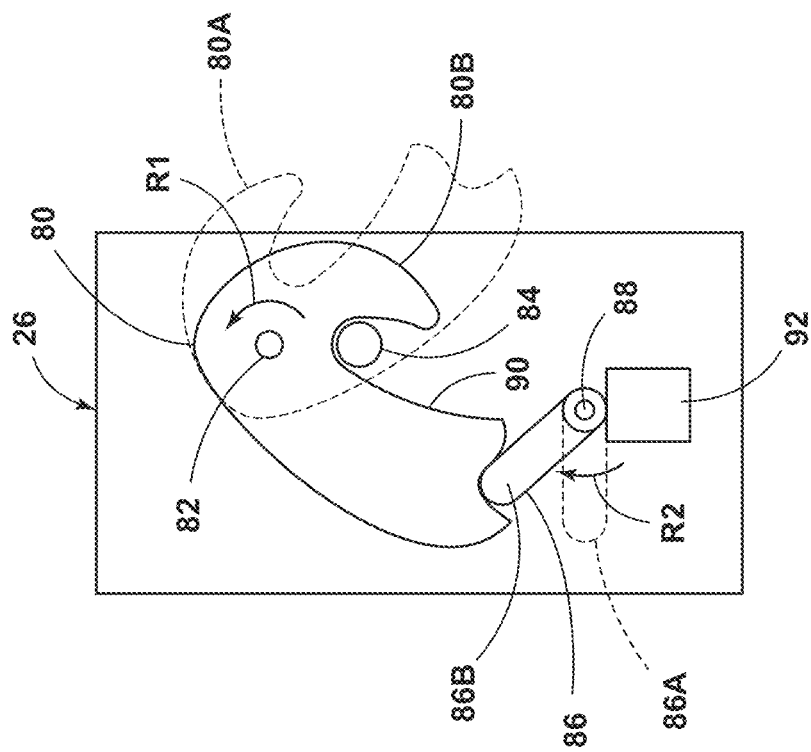
FIG. 3 is a schematic view of a powered latch mechanism.

With further reference to FIG. 3, powered latch 26 may include a claw 80 that pivots about a pivot 82. In use, when door 5 is open, claw 80 will typically be in an extended position 80A. As the door 5 is closed, surface 90 of claw 80 comes into contact with a striker 84 that is mounted to the vehicle body structure 2. Contact between striker 84 and surface 90 of claw 80 causes the claw 80 to rotate about pivot 82 in the direction of the arrow "R1" until the claw 80 reaches the closed position 80B. A pawl 86 is rotatably mounted for rotation about a pivot 88. Pawl 86 can be moved between a disengaged or unlatched position 86A and a latched or engaged configuration or position 86B. When claw 80 is in the closed position 80B, and pawl 86 is in the engaged position 86B, pawl 86 prevents rotation of claw 80 to the open position 80A, thereby preventing opening of door 5. Claw 80 may be biased by a spring or the like for rotation in a direction opposite the arrow R1 such that the claw 80 rotates to the open position 80A unless pawl 86 is in the engaged position 86B. Pawl 86 may be biased by a spring or the like in the direction of the arrow R2 such that pawl 86 rotates to the engaged position 86B as claw 80 rotates to the closed position 80B as striker 84 engages claw 80 as door 5 is closed. Latch 26 can be unlatched by rotating pawl 86 in a direction opposite the arrow R2 to thereby permit rotation of claw 80 from the closed position 80B to the open position 80A. A powered actuator such as an electric motor 92 may be operably connected to the pawl 86 to thereby rotate the pawl 86 to the disengaged or unlatched position 86A. Controller 24 can cause powered latch 26 to shift from a latched configuration or state to an unlatched configuration or state by causing powered actuator 92 to rotate pawl 86 from the latched or engaged position 86B to the unlatched configuration or position 86A. Thus, the rigid handle structure 10 does not need to be moved in order to unlatch the powered latch 26. It will be understood that various types of powered latches may be utilized in connection with the door 5 of the present disclosure, and the powered latch 26 need not include the claw 80 and powered pawl 86 as shown in FIG. 3. For example, powered actuator 92 could be operably interconnected with the claw 80 utilizing a mechanical device other than pawl 86 to thereby shift the powered latch 26 between latched and unlatched states. In general, vehicle door 5 can be pulled open if powered latch 26 is in an unlatched state, but the powered latch 26 retains the vehicle door 5 in a closed position when the powered latch 26 is in a latched state or configuration. Controller 24 may be configured to store a "locked" or "unlocked" state of latch 26. Controller 24 may also be configured such that the controller 24 does not unlatch powered latch 26 unless the controller 24 has an "unlocked" state stored for powered latch 26.

Figure 4:
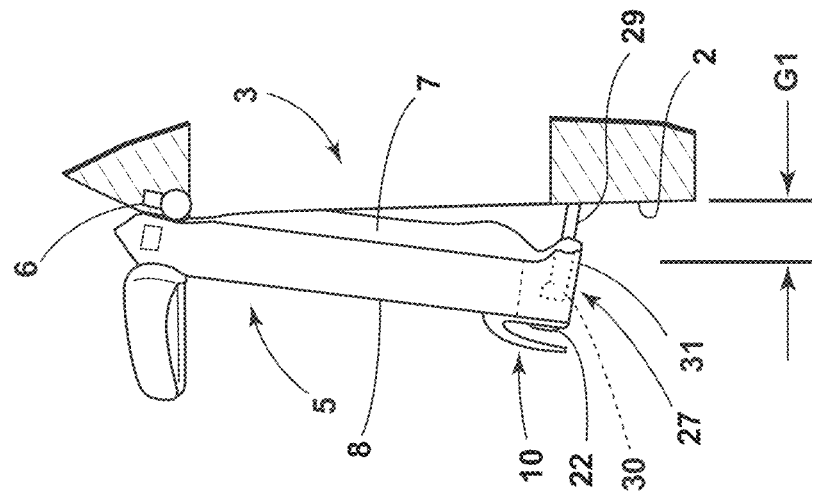
FIG. 4 is a schematic view of a powered door opening mechanism including a plunger that can be extended to at least partially open the door.

With further reference to FIG. 4, the electrically-powered door opening mechanism 27 may include a plunger 29 that extends from the inner side of door 5 upon actuation of electric motor 30 by controller 24. When the plunger 29 is extended, door 5 is moved to a partially open presenting position in which the rear edge 31 of door 5 is spaced apart a distance "G1" from vehicle body 2. The powered door opening mechanism 27 may be configured to initially open the door and break seal loads, break ice, etc. such that minimal force may be required by a user pulling outwardly on handle 10 to move from the partially open position to an open position permitting user entry into the vehicle 1. The powered latch 26 and powered door opening mechanism 27 may be substantially similar to the corresponding mechanisms described in more detail in U.S. Patent Publication No. 2018/0058128, filed on Aug. 24, 2016, now U.S. Pat. No. 10,329,823, issued Jun. 25, 2019, and entitled "ANTI-PINCH CONTROL SYSTEM FOR POWERED VEHICLE DOORS," the entire contents of which is incorporated herein by reference.

During use of the vehicle door 5, a user initially generates a door open signal to controller 24 by pushing button 22, or via fob 28 or other input mechanism or feature. If predefined conditions are satisfied (e.g. an authorized user is present), controller 24 will unlatch powered latch 26, and actuate powered door opening mechanism 27 to thereby partially open the vehicle door 5 as shown in FIG. 4. A user can then grasp the outer grip portion 16 of rigid handle 10 to open the door 5. It will be understood that the powered latch 26 may be actuated either before or after the electric door opening mechanism 27 is actuated. If the powered door mechanism 27 is actuated first, the powered latch mechanism 26 will initially retain the vehicle door 5 in a closed position until the powered latch 26 is actuated (unlatched), thereby allowing the powered door opening 27 to shift the door 5 from a closed position to a partially open position.

With further reference to FIGS. 5-9, vehicle door 5 includes a door structure 32 having forward and rearward portions 33 and 34, respectively. The vehicle door 5 further includes an internal door structure 35 and inner and outer panels 36 and 37. The outer panel 37 (FIG. 8) includes forward and rearward edges 38 and 39, respectively, and an upper edge 40 extending horizontally along the belt structure 12 of the vehicle door 5 between the forward and rearward edge portions 38 and 39, respectively. A lower edge 41 of outer panel 37 extends horizontally between the forward and rearward edges 38 and 39 of outer panel 37. The pillar 19 and upper frame member 20 form a window frame 42 that is rigidly attached to the internal door structure 35.

Figure 11:
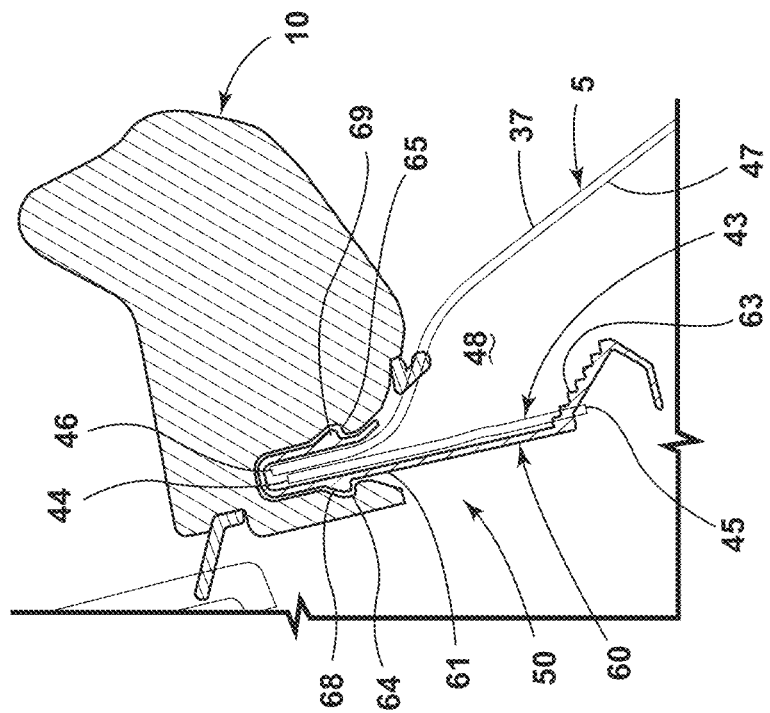
FIG. 11 is a cross-sectional view taken along the line XI-XI of FIG. 9.
Figure 10:
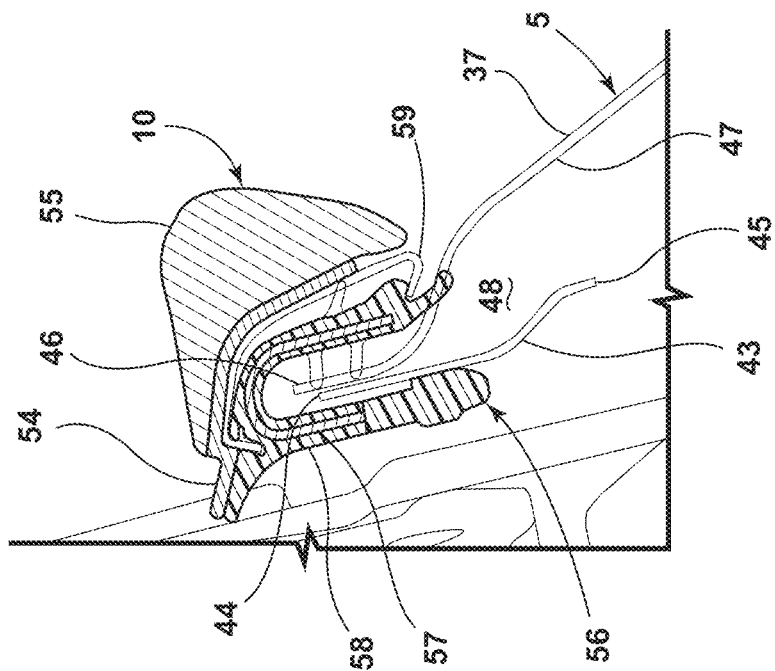
FIG. 10 is a cross-sectional view taken along the line X-X of FIG. 9.

With further reference to FIGS. 10 and 11, the internal door structure 35 includes a belt reinforcement 43 having upper and lower edge portions 44 and 45, respectively. An upper edge portion 46 of outer panel 37 overlaps and abuts the upper edge portion 44 of the belt reinforcement 43. The belt reinforcement 43 may be in the form of a flange that extends along an inner side 47 of outer panel 37 adjacent the upper edge portion 46 of the outer panel 37. At least a portion of the belt reinforcement 43 may be spaced apart from the outer panel 37 to form a gap or space 48.

With reference to FIG. 7, the rigid handle structure 10 includes a base such as elongated horizontal portion 14 and a transverse connecting portion 15 extending transversely outwardly from the elongated horizontal portion 14. The outer grip portion 16 is cantilevered, and extends rearwardly from the transverse connecting portion 15 whereby the forward portion 15 comprises the sole structural connection of the outer grip portion 16 to the door structure. A rear end 49 of the outer grip portion 16 is spaced apart from the elongated horizontal portion 14 to form a gap 17. In general, the gap 17 is large enough to permit a user to insert his or her fingers between the outer grip portion 16 and the horizontal portion 14. The outer grip portion may have a substantially linear configuration, and may be substantially parallel to the elongated horizontal portion 14. The horizontal portion 14, transverse portion 15, and outer grip portion 16 are preferably a one-piece integral structure. For example, the rigid handle structure 10 may comprise a single, unitary cast metal structure.

When assembled, a resilient gasket 54 may be positioned between the handle structure 10 and the door structure 5. The rigid handle structure 10 may be rigidly connected to the door structure 5 by one or more connectors such as a first connector 50, a second connector 51, and a third connector 52.

Figure 9:
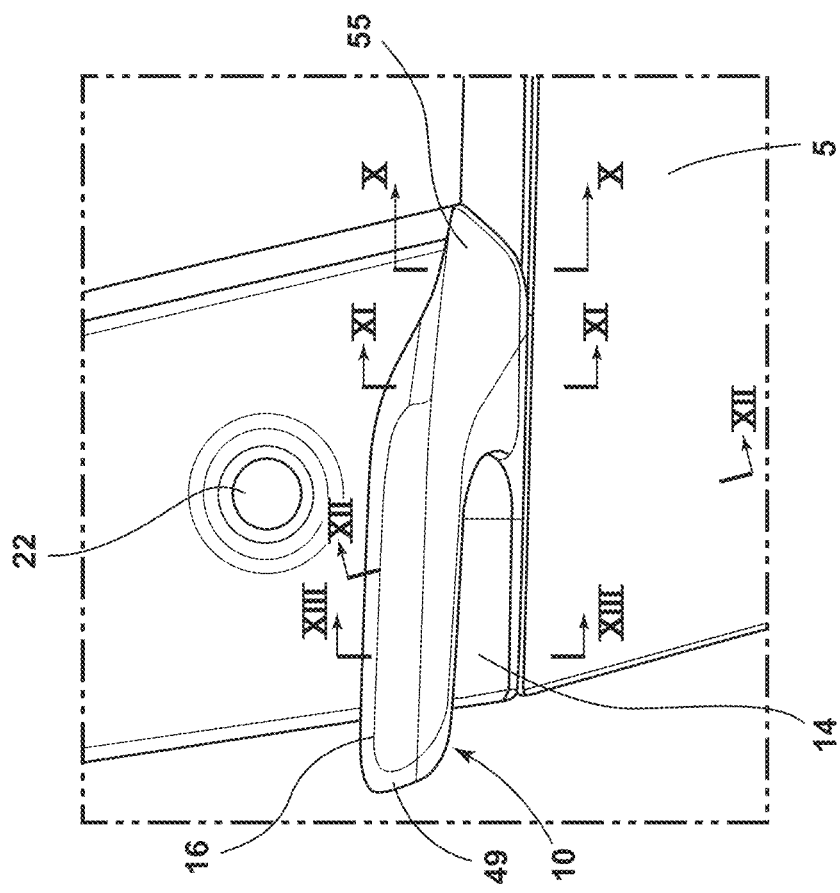
FIG. 9 is a partially fragmentary enlarged view of a portion of the door of FIG. 8.
Figure 8:
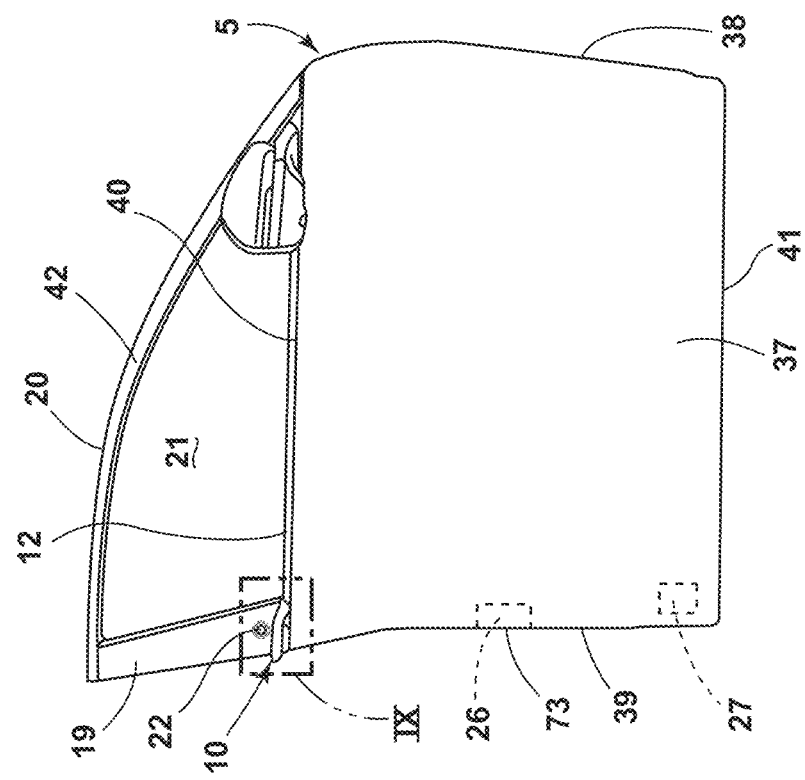
FIG. 8 is a side-elevational view of the vehicle door of FIG. 1.

With reference to FIGS. 9 and 10, at forward end 55 of handle structure 10, an outer belt molding 56 extends over the upper end portion 44 of belt reinforcement 43 and upper edge portion 46 of outer panel 37. The outer belt molding 56 may be constructed in a manner that is substantially similar to known belt moldings, and may include a metal inner reinforcement 57 as encapsulated in a polymer or elastomeric material 58. The outer belt molding 56 and a first clip 59, in combination with gasket 54 provide a water tight sealed connection between the forward end 55 of handle 10 and the vehicle door structure 5.

With reference to FIGS. 7, 9, and 11, second connector 50 comprises a second clip 60 having a U-shaped upper portion 61 that is received in a downwardly-opening groove or channel 62 in rigid handle 10. When assembled, the upper end portion 44 of belt reinforcement 43 and upper edge portion 46 of outer panel 37 are received in the U-shaped portion 61 of second clip 60 and a lower end portion 63 of second clip 60 engages lower edge 45 of belt reinforcement 43 to thereby retain second clip 60 to belt reinforcement 43. The groove 62 of rigid handle 10 preferably includes retaining grooves 64 and 65 on sidewalls 66 and 67, respectively, of groove 62 that receive protrusions 68 and 69, respectively, of second clip 60 to thereby retain the U-shaped portion 61 of second clip 60 in groove 62 of handle 10. The groove 62 of rigid handle 10 forms a hook structure that rigidly secures the handle 10 to the internal door structure 35 (belt reinforcement 43) and the outer panel 37.

Figure 5:
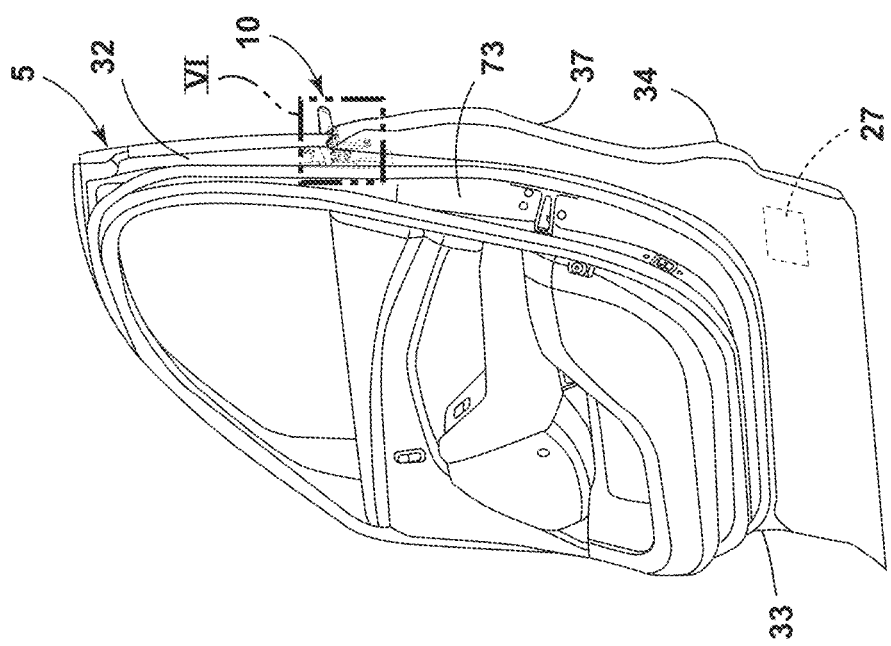
FIG. 5 is an isometric view of a rear portion of the door of FIG. 1.
Figure 12:
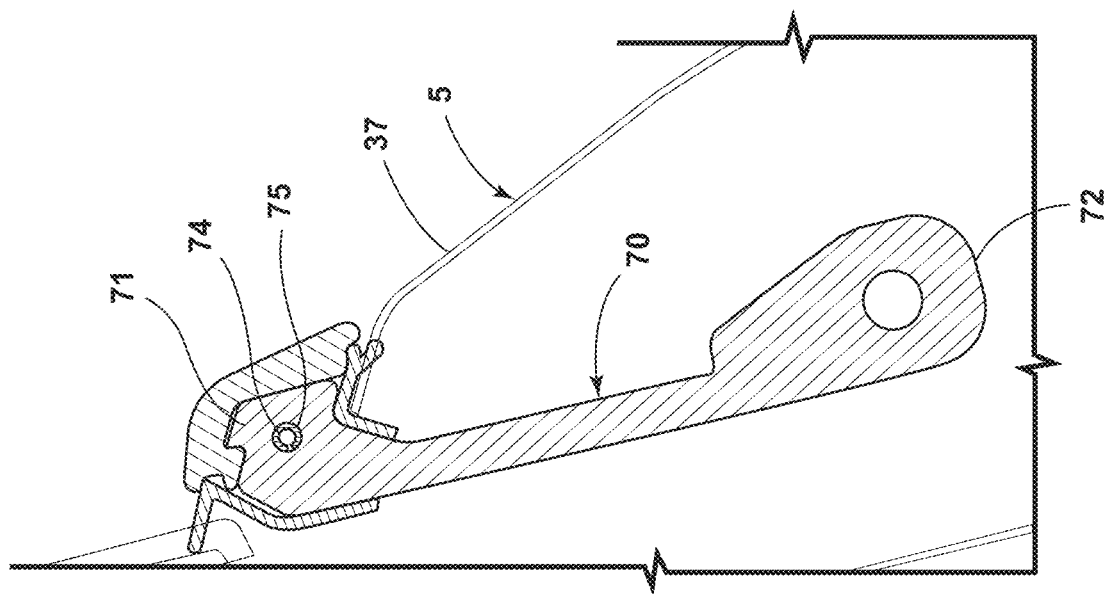
FIG. 12 is a cross-sectional view taken along the line XII-XII of FIG. 9.

With further reference to FIGS. 7 and 12, second connector 51 comprises a rigid link 70 having an upper end 71 that is rigidly connected to the elongated horizontal portion 14 of handle 10 and a lower end 72 that is rigidly connected to shut-face panel 73 (FIG. 5). Upper end 71 of link 70 includes an opening 75 that receives a pin 74. When assembled, pin 75 extends through openings 76 in horizontal portion 14 of rigid handle 10, and through opening 75 of link 70 to thereby rigidly interconnect the upper end 71 of link 70 to the rigid handle structure 10. Lower end 72 of link 70 includes an opening 77 that receives a threaded fastener 78 to thereby rigidly secure lower end 72 of link 70 to the shut-face panel 73. The shut-face panel 73 may include an opening that receives threaded fastener 78, or a conventional nut or other suitable connector may be utilized to secure the lower end 72 of link 70 to shut-face panel 73.

Figure 6:
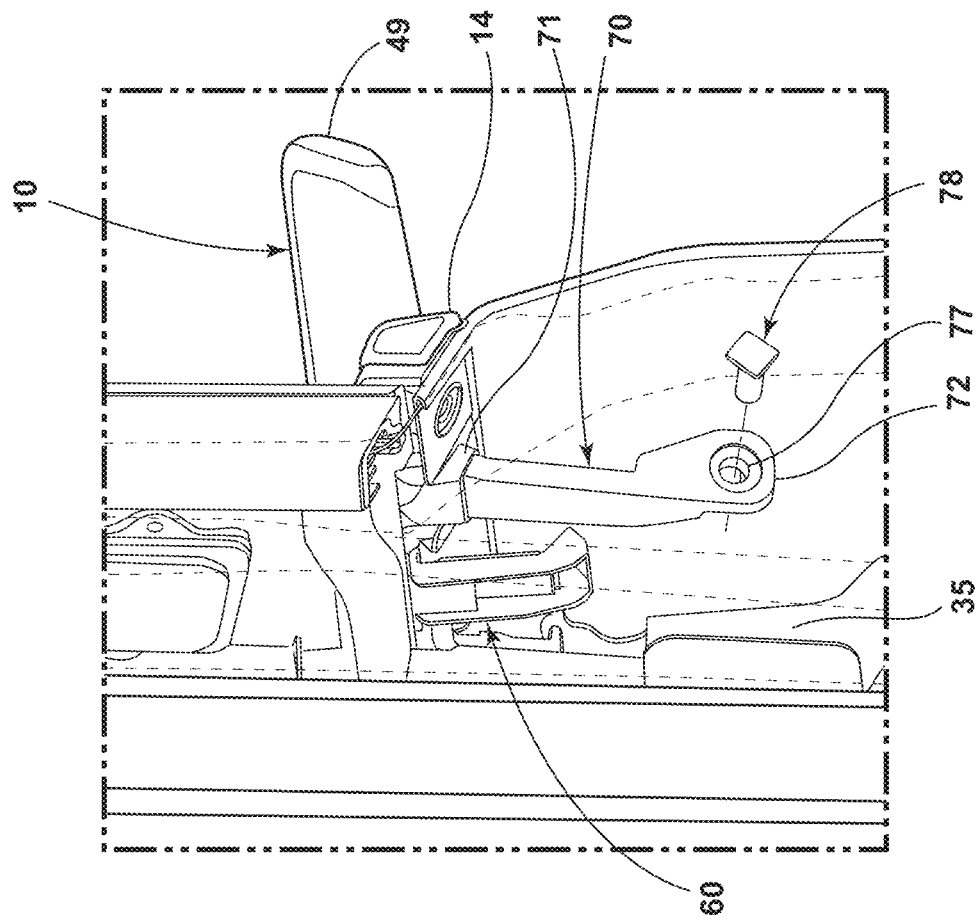
FIG. 6 is a partially fragmentary isometric view of a portion of the door of FIG. 5.
Figure 13:
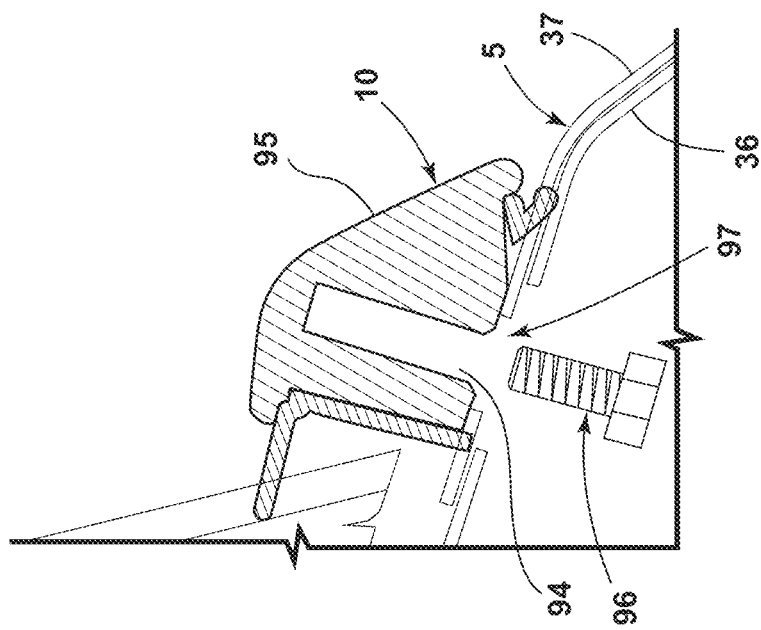
FIG. 13 is a cross-sectional view taken along the line XIII-XIII of FIG. 9.

With further reference to FIGS. 6, 7, and 13, third connector 52 may comprise a threaded opening 94 in a rear portion 95 of horizontal portion 14 of rigid handle 10. A threaded fastener 96 (FIG. 13) extends through an opening 97 in inner and outer panels 37, and into threaded opening 94 to thereby rigidly secure the rear portion 95 of horizontal portion 14 of rigid handle 10 to the vehicle door structure 5.

The first, second, and third connectors 50-52, respectively, securely and rigidly interconnect the rigid handle structure 10 to the vehicle door structure 5. The handle structure 10 is streamlined and unobtrusive. In particular, the handle 10 is generally aligned with the belt structure 12 (FIG. 1) to thereby create a clean, uncluttered appearance. Also, because the rigid handle structure 10 is immovably fixed to the door structure 5, the handle 10 is durable and not prone to wear associated with moving parts.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle door comprising:
a door structure having forward and rearward portions and including an internal door structure, and an outer panel having forward and rearward edges, a lower edge extending between the forward and rearward edges, and an upper edge extending horizontally along a belt line of the vehicle door between the forward and rearward portions, the door structure further including a window frame having an upright rear pillar attached to the internal door structure and extending upwardly above the rearward edge, the window frame including an upper portion having a rearward end attached to an upper end of the upright pillar, and a forward end attached to the internal door structure, whereby the door structure forms a window opening above the belt line of the vehicle door, and wherein the internal door structure includes a belt reinforcement extending along an inner side of the outer panel adjacent the upper edge of the outer panel, wherein the belt reinforcement is spaced inwardly from the upper edge of the outer panel, the door structure including an upright rearwardly-facing shut-face panel;
a rigid handle structure having an elongated horizontal portion and a transverse connecting portion extending outwardly from the elongated horizontal portion, and a cantilevered outer grip portion extending horizontally rearwardly from the transverse connecting portion whereby the transverse connecting portion comprises a sole structural connection of the outer grip portion to the elongated horizontal portion, and wherein the elongated horizontal portion extends horizontally rearwardly from the transverse connecting portion whereby the elongated horizontal portion and the outer grip portion are both disposed rearwardly of the transverse connecting portion;
a first connector connecting the elongated horizontal portion of the rigid handle structure to the belt reinforcement adjacent the transverse connecting portion;
a second connector connecting the elongated horizontal portion of the rigid handle structure to the shut-face panel.

2. A vehicle door, comprising:
a door structure having forward and rearward portions and including an internal door structure, and an outer panel having forward and rearward edges, a lower edge extending between the forward and rearward edges, and an upper edge extending horizontally along a belt line of the vehicle door between the forward and rearward portions, the door structure further including a window frame having an upright rear pillar attached to the internal door structure and extending upwardly above the rearward edge, the window frame including an upper portion having a rearward end attached to an upper end of the upright pillar and a forward end attached to the internal door structure, whereby the door structure forms a window opening above the belt line of the vehicle door, and wherein the internal door structure includes a belt reinforcement extending along an inner side of the outer panel adjacent the upper edge of the outer panel, wherein the belt reinforcement is spaced inwardly from the upper edge of the outer panel, the door structure including an upright rearwardly-facing shut-face panel;
a rigid handle structure having an elongated horizontal portion and a transverse connecting portion extending outwardly from the elongated horizontal portion, and a cantilevered outer grip portion extending horizontally rearwardly from the transverse connecting portion whereby the transverse connecting portion comprises a sole structural connection of the outer grip portion to the elongated horizontal portion;
a first connector connecting the elongated horizontal portion of the rigid handle structure to the belt reinforcement adjacent the transverse connecting portion;
a second connector connecting the elongated horizontal portion of the rigid handle structure to the shut-face panel;
the first connector comprises a hook structure engaging the belt reinforcement, whereby a portion of the belt reinforcement is received in the hook structure.

3. The vehicle door of claim 2, wherein:
the hook structure forms a downwardly-opening groove, and the belt reinforcement comprises an upright flange disposed in the downwardly-opening groove.

4. The vehicle door of claim 1, wherein:
the rigid handle structure comprises a one-piece integrally formed structure including:
an outer belt molding extending along the upper edge of the outer panel, and wherein the transverse connecting portion includes a base portion that is horizontally aligned with the outer belt molding, wherein the base portion and the outer belt molding have substantially equal vertical dimensions.

5. The vehicle door of claim 3, wherein:
the upper edge of the outer panel is disposed in the downwardly-opening groove.

6. The vehicle door of claim 5, including:
a clip having an upper U-shaped portion disposed in the downwardly-opening groove, wherein the upper edge of the outer panel and an upper edge portion of the belt reinforcement are received in the U-shaped portion of the clip;
and wherein the belt reinforcement includes a lower edge portion, the clip including a lower connector engaging the lower edge portion of the clip to thereby prevent upward movement of the clip.

7. The vehicle door of claim 6, wherein:
the downwardly-opening groove includes spaced apart sidewalls, each sidewall including a retaining groove;
the U-shaped portion of the clip includes tapered projections that are received in the retaining grooves.

8. The vehicle door of claim 1, wherein:
the second connector comprises a rigid link having an upper end connected to the elongated horizontal portion of the rigid handle structure, and a lower end connected to the shut-face panel whereby the rigid link prevents vertical movement of the elongated horizontal portion relative to the shut-face panel.

9. The vehicle door of claim 8, wherein:
the upper end of the rigid link is connected to the elongated portion of the rigid handle structure by a pin.

10. The vehicle door of claim 8, including:
a third connector connecting the elongated portion of the rigid handle structure to the door structure adjacent an upper portion of the rearward edge of the outer sheet.

11. The vehicle door of claim 10, wherein:
the door structure includes an inner panel having a rearward edge that abuts and overlaps the outer panel adjacent the rearward edge of the outer panel;
and wherein the third connector comprises a threaded fastener extending through openings in the inner and outer panels where the inner and outer panels abut and overlap.

12. The vehicle door of claim 1, wherein:
the door structure includes an inner side, and including:
an electrically-powered door opening mechanism including a plunger that extends from the inner side of the door structure adjacent a rear portion of the door structure when the electrically-powered door opening mechanism is actuated to thereby move the door structure away from a vehicle body and including:
a powered latch mechanism that can be actuated and unlatched electronically without movement of the rigid handle structure.

13. The vehicle door of claim 1, wherein:
at least a portion of the rigid handle structure is disposed above a horizontal plane passing through the upper edge of the outer panel.

14. A vehicle door comprising:
a door structure having inner and outer sides and a horizontal belt structure extending in a fore-aft direction along an upper edge of an outer panel of the door structure;
a rigid handle having an elongated rigid base and an elongated rigid outer grip portion that is generally parallel to the elongated rigid base, the elongated rigid outer grip portion including a rear end portion that is spaced apart from the base to form a gap that opens rearwardly, wherein a forward portion of the elongated rigid outer grip portion is rigidly fixed to the elongated rigid base, and wherein the forward portion of the elongated rigid outer grip portion is horizontally aligned with the horizontal belt structure, and wherein the elongated rigid base of the rigid handle is rigidly connected to the horizontal belt structure whereby the elongated rigid outer grip portion of the rigid handle does not move relative to the horizontal belt structure; and
an electrically powered door opening mechanism including a plunger that extends from the inner side of the door structure adjacent a rear portion of the door structure when the electrically powered door opening mechanism is actuated to thereby move the door structure away from a vehicle body.

15. The vehicle door of claim 14, wherein:
the elongated rigid base is rigidly connected to the door structure by horizontally spaced apart first, second, and third connectors.

16. The vehicle door of claim 15, wherein:
the door structure includes a rear shut-face panel;
at least one of the first, second, and third connectors comprises a rigid link extending between and connecting the elongated rigid base of the rigid handle to the shut-face panel.

17. The vehicle door of claim 16, wherein:
the horizontal belt structure includes a flange having an upper edge;
the elongated rigid base including a downwardly-opening groove;
the upper edge of the flange is received by the downwardly-opening groove.

18. The vehicle door of claim 17, wherein:
the door structure includes inner and outer panels having rear edge portions that abut and overlap one another, the door structure having aligned fastener openings through the rear edge portions; and including:
a mechanical fastener extending through the fastener openings and connecting the elongated rigid base of the rigid handle to the inner and outer panels.

19. The vehicle door of claim 14, wherein:
at least a portion of the handle extends over an upper edge of the horizontal belt structure in a horizontal direction that is transverse to the fore-aft direction.

20. The vehicle door of claim 14, including;
an electrically-powered door opening mechanism including a plunger that extends from the inner side of the door structure adjacent a rear portion of the door structure when the electrically-powered door opening mechanism is actuated to thereby move the door structure away from a vehicle body and wherein:
the elongated rigid base and the elongated rigid outer grip portion comprise a U-shaped integral one-piece structure.

* * * * *